F. H. BICKFORD.
CALCULATING MACHINE.
APPLICATION FILED SEPT. 5, 1911.

1,069,104.

Patented Aug. 5, 1913.
7 SHEETS—SHEET 1.

WITNESSES:

INVENTOR
Frank H. Bickford
BY
Ralph S. Warfield
ATTORNEY

F. H. BICKFORD.
CALCULATING MACHINE.
APPLICATION FILED SEPT. 5, 1911.

1,069,104.

Patented Aug. 5, 1913.

F. H. BICKFORD.
CALCULATING MACHINE.
APPLICATION FILED SEPT. 5, 1911.

1,069,104.

Patented Aug. 5, 1913.

WITNESSES:
A. M. Gardes.
W. H. Kritz.

INVENTOR
Frank H. Bickford
BY
Ralph S. Warfield
ATTORNEY

F. H. BICKFORD.
CALCULATING MACHINE.
APPLICATION FILED SEPT. 5, 1911.

1,069,104.

Patented Aug. 5, 1913.
7 SHEETS—SHEET 6.

WITNESSES:

INVENTOR
Frank H. Bickford
BY
Ralph S. Warfield
ATTORNEY

UNITED STATES PATENT OFFICE.

FRANK H. BICKFORD, OF MUNCIE, INDIANA, ASSIGNOR TO THE ADDER MACHINE COMPANY, OF WILKES-BARRE, PENNSYLVANIA, A CORPORATION OF PENNSYLVANIA.

CALCULATING-MACHINE.

1,069,104.    Specification of Letters Patent.    Patented Aug. 5, 1913.

Application filed September 5, 1911. Serial No. 647,646.

*To all whom it may concern:*

Be it known that I, FRANK H. BICKFORD, a citizen of the United States, residing at Muncie, Delaware county, Indiana, have invented new and useful Improvements in Calculating-Machines, of which the following is a specification.

This invention relates to calculating machines, and more particularly to improvements in means to prevent the over-rotation of the registers thereof.

In the well-known Wales calculating machine, in connection with which this invention is illustrated, the adding operation is started by depressing keys which interpose stops in the paths of register-driving devices. The initial stroke of the main shaft releases the resigter-driving devices which are automatically propelled against said stops. After the arrest of the register-driving devices by said stops, the registers or numeral wheels and driving means are connected, and upon the return or reverse stroke of the shaft, restoring means contact with the register-driving devices to return them to initial position. During such return, said devices rotate the wheels to cause the latter to register the amount indicated by the values of the depressed keys, after which the wheels and their driving means are disconnected. Carrying mechanisms to transfer from one wheel to another are also provided; the carrying action taking place after the adding or registering operation.

It is customary to provide means to prevent over-rotation of the numeral wheels, (due to acquired momentum), at the time of disengagement of the driving devices therefrom, such wheel-arresting means being especially desirable when the machine is operated rapidly. Over-rotation-preventing devices have generally taken the form of detents engaging ratchets, or their equivalents, said ratchets being fixed to turn with the numeral wheels.

One object of the present invention is to enable the over-rotation preventers to act more quickly both in releasing the adding wheels and in reëngaging therewith.

To take a total of the amount registered on the Wales machine, or to clear the machine, a key controlling the time of connection and disconnection of the numeral wheels or counters and their driving means, is operated to effect such connection prior to the propulsion of the driving means, and at the beginning of the initial stroke of the main shaft, so that, when the driving means are released, they will turn the wheels until the latter are arrested by the contact of stops thereon with checks shiftable into the path of the stops by the operation of the key. The wheels and their driving means are disengaged at the beginning of the return stroke of the main shaft, after which the driving means are restored to initial position, leaving the register cleared, or at zero.

Another object of the invention is to enable the over-rotation-preventing detents to be more speedily withdrawn from the wheels when a total is to be taken to obviate any possibility of contact when the wheels are in motion.

Other objects and advantages will hereinafter appear and be more fully pointed out in the claims.

In the accompanying drawings

Although the invention is shown in connection with a Wales calculating machine, its use is not confined thereto or even to "key-set" machines.

Figure 5:
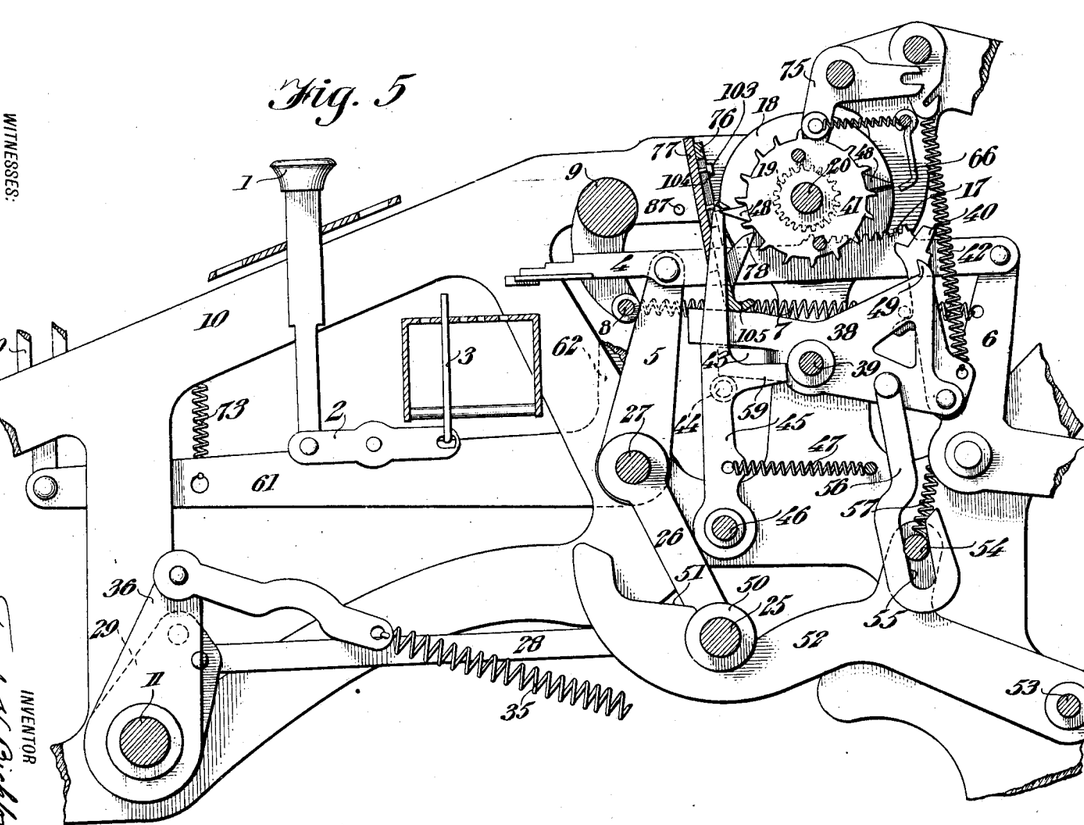
Fig. 5 is a longitudinal section through the machine, when idle.

Adding machines of the "key-set" type include, generally, a key-section, and a register-section. The key-section comprises several keys, arranged in rows or banks to form a selective key board. Depression of any of the keys, as 1, rocks a lever 2 to project a stop 3. (Fig. 5.) There are as many stops 3 as there are keys, the stops controlled by each bank or series of keys, being arranged in a row, one stop only being shown.

The register mechanism includes rack bars 4 to cooperate with each row of stops. Said rack bars are each pivoted on front and rear arms 5 and 6 and are driven against the stops by springs 7 connected respectively to the rear arms 6 and to a rod or bail 8, carried by a rock shaft 9 journaled in the side frames 10 of the machine. Said rod 8 lies in the paths of the forward arms 5 to normally restrain the latter and the rack bars against the action of the springs. An oscillatory main drive shaft 11 turns the rock shaft 9; by an arm 12 (Figs. 1 and 2) fixed to turn with the drive shaft and having a roll 13 fitting in a cam slot 14 formed in a crank 15 fixed to the rock shaft. Said main shaft on its initial stroke, withdraws said bail to free the bars 4 to the action of the springs, and on its return stroke, presses said rod against the arms 5 to return the bars to rest. The main drive shaft may be turned by a handle 16.

Racks 17 (Fig. 5) on the rack bars 4, turn numeral wheels 18 or counters through pinions 19 fast with said wheels to effect the appropriate registration of the amounts set up on the key board, and to return said wheels to zero when the machine is cleared.

The numeral wheels turn on an axle 20 (Fig. 2) mounted in arms 21 pivoted at 22 to the side frames 10, and are normally held out of engagement with the racks by lifting props 23 pivoted to the arms 21 at 24, said props being slotted, as at 23ᵃ, and resting on a rod 25 (Figs. 1 and 5) carried by swinging arms 26 turning on a shaft 27 journaled in the side frames. Links 28 join the rod 25 preferably to cranks 29 on the main shaft.

In the adding operation, the desired keys having been operated to set the corresponding stops 3, the main drive shaft is turned on its initial stroke and immediately draws the rod 25 forwardly along a descending arc, thereby swinging the props 23 to lower the numeral wheels to effect the engagement of the pinions with the racks. Such engagement, however, is deferred by legs or supports 30 pivotally connected to the axle 20 and seating on rests 32 on the side frames. While the props are being drawn forwardly from their supporting positions, the arm 12 turning with the drive shaft is idly traversing the cam slot 14 in the crank 15, but when the main shaft has partially completed its stroke, the arm 12 contacts the cam surface 14ᵃ of the slot to turn rock shaft 9 and withdraw the rack-restraining rod 8 from the front arms 5, whereupon the rack-bars 4 are propelled by the springs 7 against said stops 3. Suitable means, not shown, arrest those racks into whose paths no stops have been projected. During the advance of the racks, the rod 25 continues to swing said props 23, and as the main shaft nears the limit of its initial stroke after the rack-bars have been arrested by their stops, said rod contacts the outer ends of slots 33 in tripping links 34 connected to the respective legs or supports 30 to pull the latter off their rests 32, (Fig. 2), whereupon the arms 21 and the numeral wheels drop to engage the pinions 19 with the racks 17 which have been positioned by the stops 3.

The return stroke of the main shaft 11 is preferably effected by a returning spring 35, (Fig. 5) connected by a crank 36 to said shaft. On such return stroke, the bail 8, controlling the rack bars, first swings to restore the latter to initial position. During such restoration, the racks turn the numeral wheels to cause them to display the correct amount at the completion of the operation.

Figure 1:
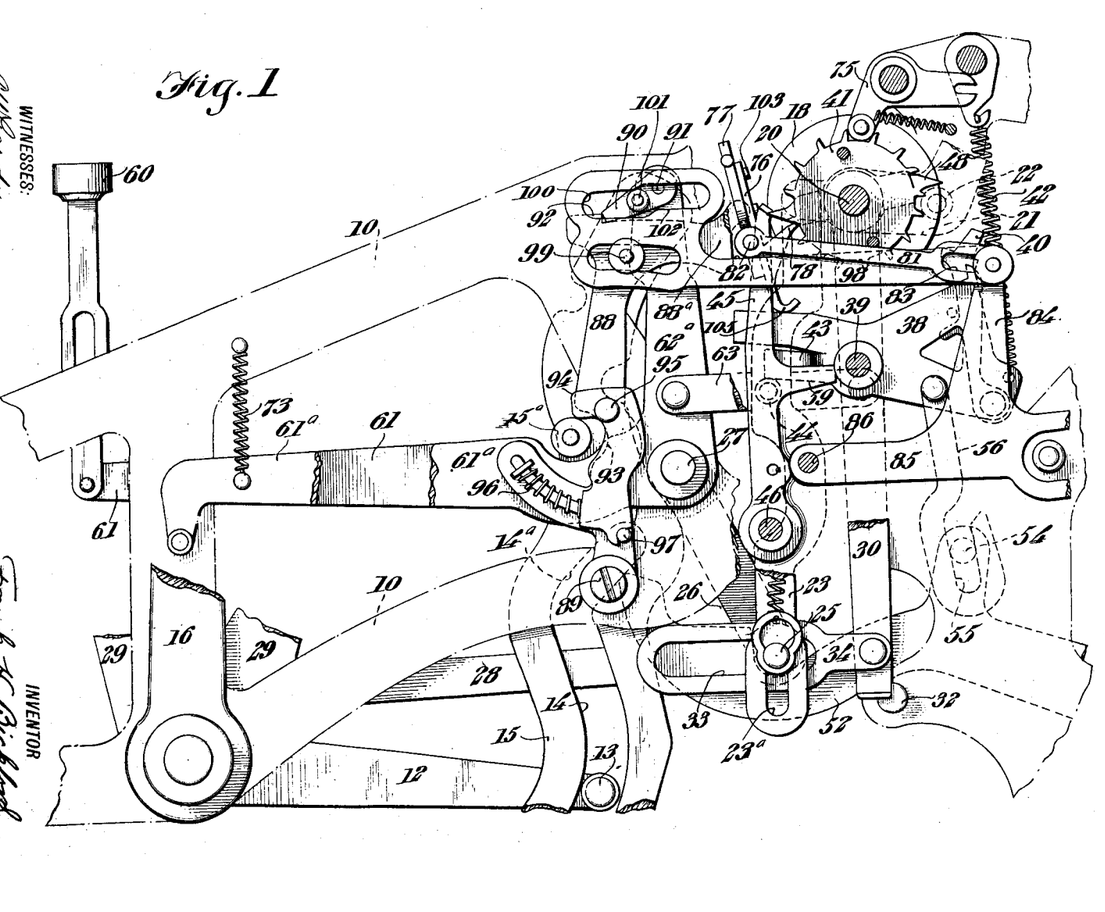
Figure 1 is a side view of one embodiment of the invention applied to the well-known Wales calculating machine, the device being in normal or idle position, with parts broken away.
Figure 2:
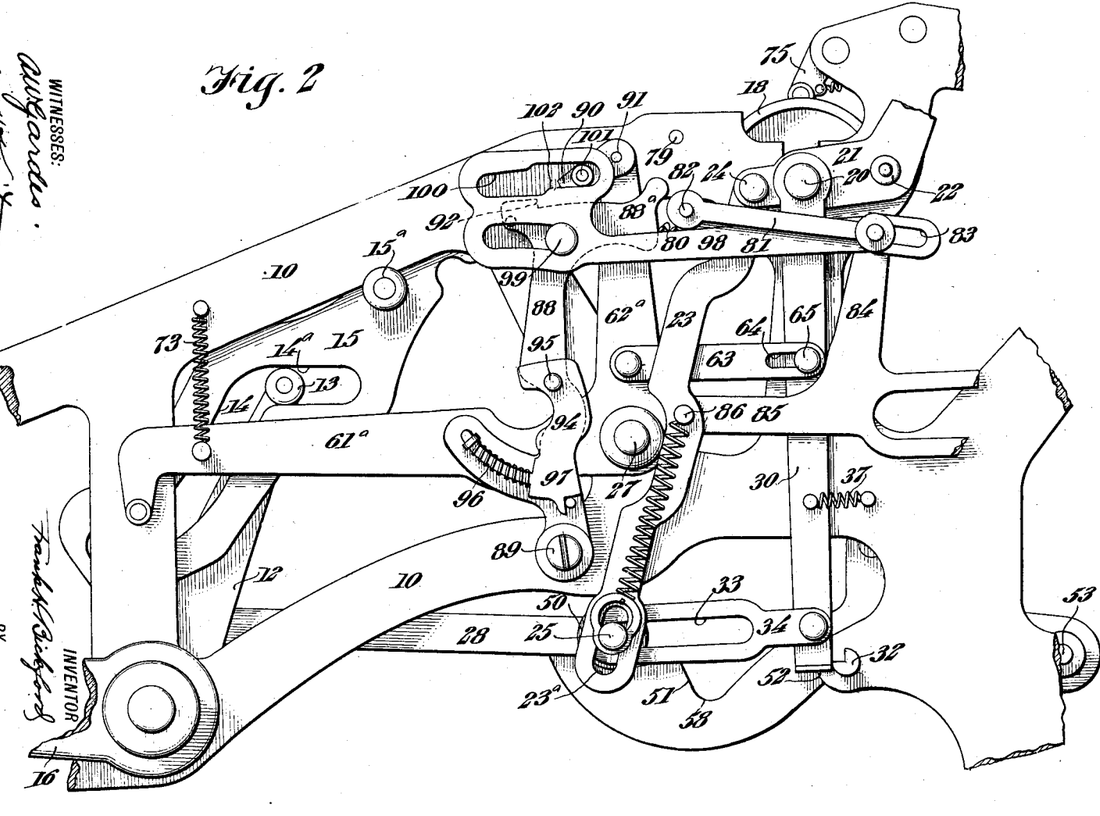
Fig. 2 is a similar view, showing the parts in the positions occupied when the main shaft is at the end of its initial stroke, in the ordinary accumulating or adding operation.

During the return of the racks, the trip rod 25 is being restored, and after said racks have reached their positions of rest, the rod contacts the upper end of the slots 23ᵃ of the props to lift the wheels and with them the numeral wheels, to disengage the latter from the racks (Fig. 1). The numeral wheel supports 30 are likewise lifted, and springs 37 may be employed to draw them into alinement with their rests 32. In practice, a slight clearance is left between said supports and their rests when the parts are idle, to avoid niceties of adjustment and insure the return of the supports 30.

Figures 6, 7:
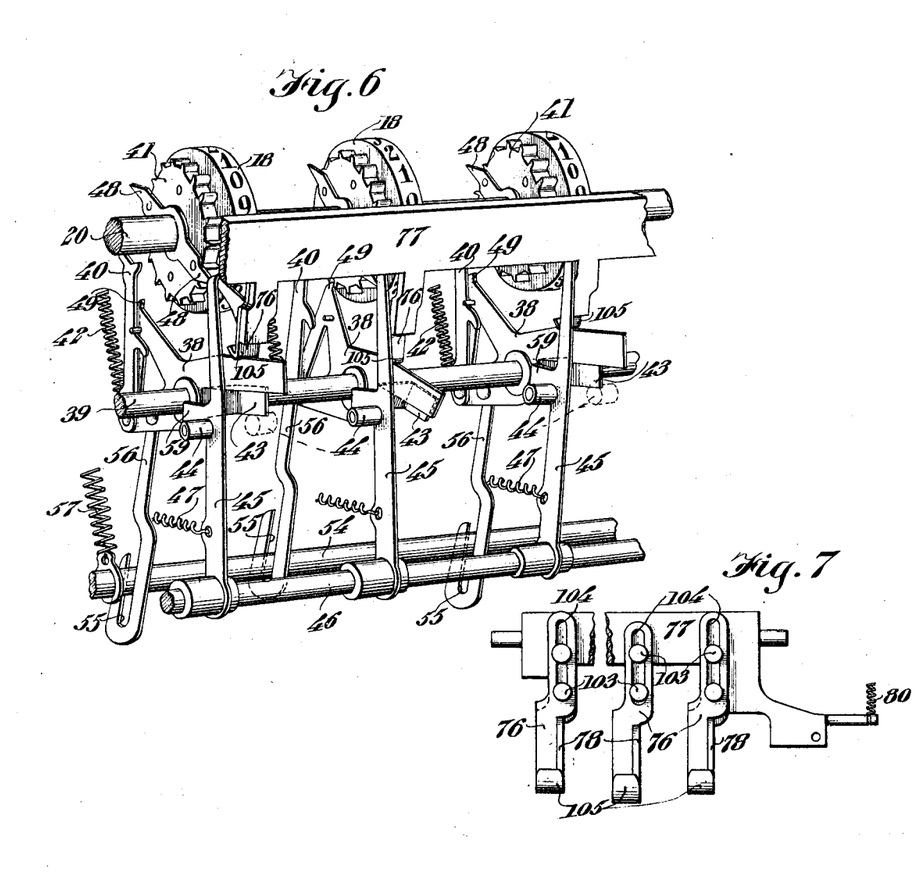
Fig. 6 is a perspective of the registers and carrying mechanism, showing their relation to the over-rotation-preventing device. In this view, the individual carrying mechanisms with their numeral wheels have been spaced apart, or disassembled from the adjacent trains of mechanisms, dotted lines showing the positions of the trigger rolls when supporting the rocking levers, and when tripped.
Fig. 7 is a detail of the over-rotation-preventing detents and their carrier.
Figure 8:
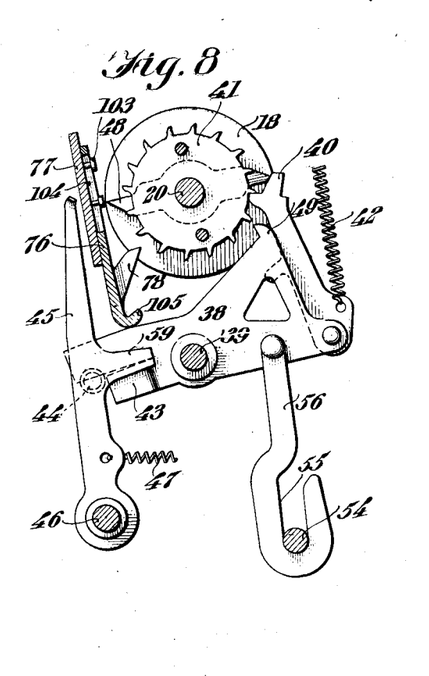
Fig. 8 is a detail of one transfer mechanism, showing it tripped and about to turn the numeral wheel.
Figure 9:
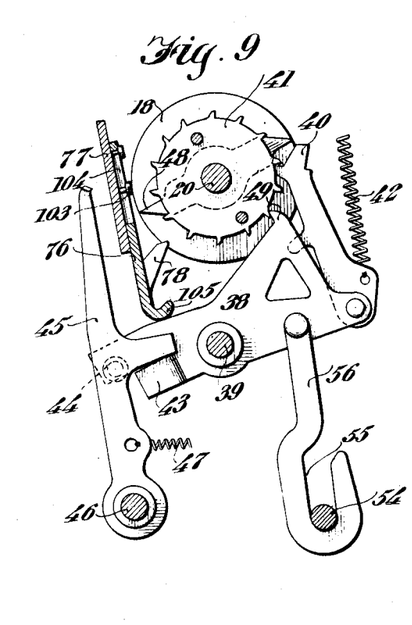
Fig. 9 shows the transfer mechanism at the completion of the carrying operation prior to being reset.

The transferring mechanism to effect a carry from one to another of the wheels, preferably comprises a rocker 38 (Figs. 6, 8, and 9) for each wheel, said rockers being mounted on a cross bar 39 extending between the side frames. A carrying pawl 40, pivoted on the rear arm of each rocker, engages a ratchet 41 fast with the numeral wheel to turn the latter. A spring 42 tends to tilt the rocker to effect said engagement, said spring being held under tension by an offset catch 43 on the rocker, seating upon a rest 44 on a trigger 45, rocking on a cross bar 46 extending between the side frames 10. Said trigger is normally held in the path of the catch by a spring 47. The upper end of the trigger projects adjacent the numeral wheel of the lower order, to the right (in Fig. 6) of that designed to be turned by the pawl, and when said right hand wheel is turned past the point at which the figure "9" is displayed, a cam 48, turning with said wheel, locks the trigger against the tension of its spring to force the rest from beneath the catch (Fig. 8). This frees the spring 42, which thereupon brings the carrying pawl 40 into engagement with its ratchet to turn the latter and the left hand numeral wheel, (or register of next highest order), one space. The wheel is arrested against over-rotation, during the carrying operation, by a tooth 49 (Fig. 9) on the rocker which engages the ratchet when the carrying pawl has turned its wheel one step. This carrying operation occurs as the wheels are being lifted to idle position after disengagement from the racks, the adding operation having been completed. The carrying mechanism is reset on the next initial stroke of the main shaft by the swinging rod 25 (Figs. 2 and 5) or by antifriction rolls 50 thereon, riding over cam faces 51 formed on rocking levers 52 pivoted on a cross bar 53 in the frame. Said levers are connected by a resetting bar 54 playing in slots 55 in resetting links 56 pivoted to the rear arms of the rockers 38. The downward swing of the rod 25 (Fig. 2) depresses said rocking levers against the tension of springs 57, to press the resetting rod 54 against the lower ends of the slots 55 in the resetting links, thereby tilting the tripped rockers 38 rearwardly against the tension of the springs 42 and raising their forward ends, so that the catches 43 clear the rests 44. The triggers are thereupon restored by springs 47 to interpose the rests 44 beneath the catches on the forward arms of rockers 38 and upon the completion of a full forward and rearward stroke of the main shaft, the rolls 50 ride off the cam faces 51 into seats 58 (Figs. 2 and 4) in the resetting levers 52 to relieve the tension on the springs 57 which raise the resetting levers to free the links 56. The carrying springs 42 then press the forward arms or catches of the rockers against their rests 44. A stop 59 arrests the trigger in reset position against the tension of its resetting spring 47.

Figure 3:
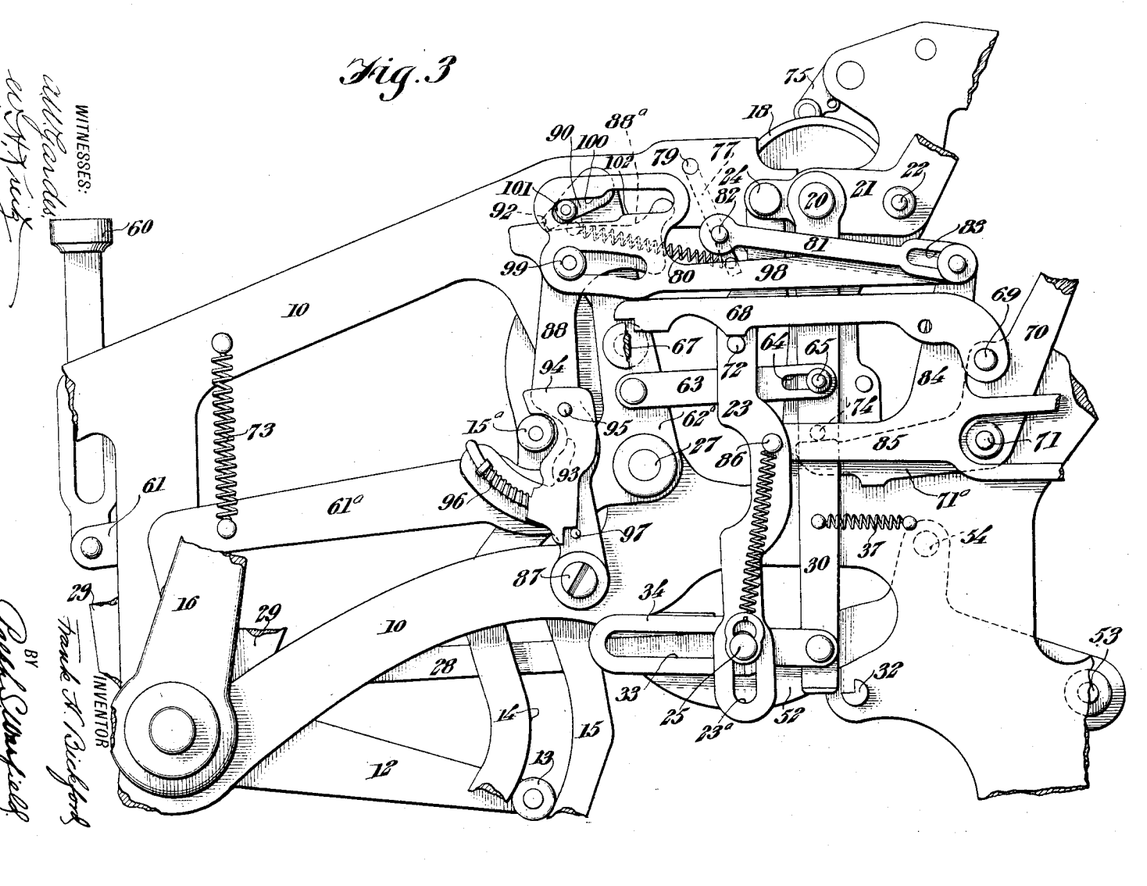
Fig. 3 is a view similar to Fig. 1, but with the total or clearing key depressed.

The rear arms 6 supporting the racks 4 may be connected to a printing section (not shown) and when it is desired to take a total, if such printing section is present, and to clear the machine, a total key 60 is depressed (Fig. 3) to rock a bent or setting lever 61 fast on the rock shaft 27, on one side of the machine. Through said rock shaft a similar bent or setting lever 61ᵃ on the opposite side of the machine is operated. Arms 62, 62ᵃ on said setting levers are connected by links 63 to the legs or supports 30 of the numeral wheels, said links having slots 64 therein fitting over pins 65 in said supports to permit the latter to swing relatively to the total key mechanism, in the ordinary accumulating operations just described. When the setting levers are rocked, they operate through said links to displace the supports relatively to their rests 32 to prevent delay in the engagement of the register wheels and their driving means when the lifting props are tripped, so that the numeral wheels drop into their racks at the beginning of the initial stroke of the main shaft as the props 23 are eased downwardly, by the swinging rod 25, and by the time the free end of the arm 12 has traversed the idle portion of the cam slot 14, the wheels have been engaged with their driving means in readiness to be turned when the racks are released by the restoring bail or rod 8. The numeral wheels are thus turned by the spring-pressed racks during their forward movement on the initial stroke of the main shaft (and in a direction reverse to the adding or accumulating rotation of the wheels), until arrested by the contact of stops on said wheels (which stops may be combined with the cams 48 as shown) with checks 66 (Fig. 5) swung into the paths of the stops by the operation of the total key through suitable and well known Wales mechanism (not shown). At such time the wheels all display zeros at the reading line.

To release the numeral wheels from their driving means at the completion of the totaling operation, so as to leave the machine clear, the setting levers carry restoring studs 67, (Fig. 3), and when rocked by the initial operation of the total key, prior to turning the main shaft, said studs clear latches 68 pivoted at 69 to angular or restoring levers 70 pivoted to the side frames, at 71. Said latches are normally held idle by rests 72 on the props 23, but the easing down of the props during the initial stroke of the main shaft in taking a total or clearing the machine permits the latches to swing into alinement with the studs 67. When the main shaft reaches the end of its initial stroke, the total keys and their setting levers are freed to the action of springs 73, and at the outset of the return stroke of the shaft, said setting levers 61, 61ᵃ are rocked to press the restoring studs 67 against the latches 68 and thereby rock the angular levers 70 to cause their arms 71ᵃ to press upwardly against pins 74 on the legs or supports 30 to lift the latter and disengage the numeral wheels from the driving means before said driving means is started on its return, by the restoring bail or rod 8. As soon as the lower ends of the supports 30 clear the rests 32, springs 37 snap the supports on to the rests which then hold the wheels in idle position until the tripping rod 25 returns the props 23.

In taking a sub-total, that is, printing an amount disclosed by the register and retaining said amount on the wheels, the total key, in the present instance, instead of being released is held in its operated position during the return stroke of the main shaft, thereby preventing the release of the numeral wheels from their driving means. As a result, the numeral wheels remain in engagement with their driving means during the return stroke of the main shaft, and after being reversely rotated, during the initial stroke of the main shaft, as explained in the operation of taking a total, are turned forwardly on the return stroke of the main shaft to again disclose the amount registered at the beginning of the sub-totaling operation. As the main shaft approaches the end of its return stroke, after having restored the rack bars, the numeral wheels are released from said rack bars by the upward travel of the tripping rod 25, as in the adding or accumulating operation, the total key being restored to idle position at the end of such return stroke.

Locking pawls 75 engaging the ratchet wheels 41 normally hold the numeral wheels against accidental turning when the latter are in idle or raised position.

The foregoing construction is old, and only constitutes part of the present invention, so far as it is combined with the new parts now to be described.

When the machine is rapidly operated through the oscillation of the main drive shaft 11, either by the handle or by a motor, the numeral wheels are turned at high speed and acquire considerable momentum, which tends to carry the wheels past their proper positions when disengaged from their driving means, and thus register inaccurate amounts. To obviate this disadvantage, over-rotation preventers in the form of detents to engage the ratchet wheels 41 have commonly been provided. It has been found, however, that in order to accommodate the detents to the varying operations of the numeral wheels, the detents must be quickly released from the ratchet wheels so as not to interfere with the movements of said wheels, either when the latter are shifting into engagement with their driving means or when turning. This is necessary because said wheels are very easily turned on the axle and when freed from the locking pawls 75 and prior to their engagement with the driving means, a slight contact or interference may be sufficient to advance or reverse them one or more steps. Also owing to the momentum referred to, it is advisable that the detents engage the ratchets not later than at the moment of the disengagement of the driving means and wheels, if not prior thereto. This is especially desirable wherever the wheels move relatively to the driving means to prevent over-rotation as the wheels are returned to idle position. To attain these ends in the present instance, the over-rotation preventer is controlled by the operation of the tripping mechanism through which the engagement and disengagement of the wheels and their driving mechanism is effected, rather than by the means controlling the registration of the amounts, which operates subsequently thereto. One embodiment of such over-rotation preventer comprises several detents 76 mounted on a carrier or plate 77 extending across the machine in front of the numeral wheels 18, the teeth 78 of which detents engage the ratchet or notched wheels 41 to arrest the latter and their respective numeral wheels.

As one means to permit the carrier to be shifted from and toward the numeral wheels to release the detents therefrom when the register is to be operated, or to engage them therewith to prevent over-rotation, said carrier is preferably pivoted at 79 in the opposite side frames, and said detents are normally held active against the tension of a releasing spring 80 (Fig. 3) by a lock, comprising a bar or coupler 81 jointed at 82 to the carrier and connected, preferably, by a pin and slot 83 to an arm 84 on a link 85 pivoted at 86 to one of the props 23 which prop, it will be remembered, is held stationary when the machine is idle, by the tripping rod 25 and its connections, and is one of the first parts operated upon the initial stroke of the drive shaft 11. Normally said arm 84 lies at the rear end of the slot 83 to hold the locking bar against forward movement by the spring 80.

Upon starting the forward or initial stroke of the drive shaft 11, in the accumulating operation, the arm 84 is drawn forwardly through its connection with the prop 23, thereby freeing the locking bar 81 and through it the carrier and its detents to the action of the spring 80 which swings the carrier to release the detents from the wheels. The locking bar 81 is drawn forwardly by the spring 80 until the carrier is arrested by a stop 87 (Fig. 5), which arrest occurs before the drive shaft has completed its initial stroke, and after such arrest, the end of the arm 84 travels idly in the slot 83 to permit the completion of said initial stroke. The carrier in shifting to inactive position contacts a restoring lever 88 lying in its path of movement and pivoted at 89, and presses it idly forward.

As the drive shaft approaches the end of its initial stroke, the registering wheels and their driving means are engaged, as heretofore stated. Upon the return stroke, said wheels are first turned by the contact of the restoring bail 8 with the racks 4 to register the appropriate amount, and just prior to the disengagement of the wheels and their driving means, a tappet or driver 15ª, preferably located on the slotted crank 15 operating the rack-restoring bail 8, strikes the restoring lever 88 to press said lever or the head 88ª thereof against the carrier 77 and thereby shift the carrier back to effective position to reëngage the detents 76 with the numeral wheels register, and arrest the numeral wheels against over-rotation. The return stroke of the main shaft, through the prop 23, also shifts the link 85 back toward effective position, but because the arm 84 must traverse the slot 83 before energizing the coupler, the operation of the detents would be delayed until after the release of the numeral wheels and their drive means, were it not for the restoring lever 88. The actual meshing of the teeth 78 with the ratchet wheels 41 of the register is timed to take place just as the register is released from the driving means, which occurs prior to the completion of the return stroke of the main drive shaft and before the registers have been returned by the props 23 to idle position. The main drive shaft in completing its return stroke, replaces the registers in idle position by swinging the props back toward the vertical, as heretofore explained, such movement of one of said props causing the link 85 to recede and carry with it the arm 84 which idly traverses the slot 83 until it reaches the end thereof, whereupon it draws the locking bar 81 backwardly to swing the detents farther into mesh with the notched wheels 41 and lock them in such position. Such locking action draws the detents from the restoring lever which normally remains in the position to which it is returned by the tappet 15ª, which holds the lever in place until the crank 15 is swung forwardly on the next operation of the machine.

It will be understood that, in the usual operation of the machine, the locking of the detents 76 in active position follows so quickly upon the restoration of the detents by the lever 88 as to constitute, in effect, a single operation.

By the foregoing arrangement, it will be noticed that the release of the over-rotation detents from the registering wheels is effected at the outset of the operation of the machine prior to the engagement of the register and its driving means, by devices which are actuated early in the initial stroke of the drive shaft (as the register tripping mechanism), and are reëngaged with the wheels prior to the return of said register to idle position by other devices operating at the proper time during the return stroke of the drive shaft, and independently of the locking coupler 81, as the rack-restoring mechanism.

In the operation of taking a total or clearing the machine, it will be remembered that the numeral wheels are engaged with their driving means before the latter are freed by the restoring bail. Therefore, it is desirable to release the detents from said wheels at the outset of the initial stroke of the main shaft 11 and effect the removal of the detents from the path of the wheels to prevent any liability of contact which might turn the wheels during their movement toward the racks and before their engagement therewith. To this end, the restoring lever 88, which is normally held in the path of the carrier by the tappet 15ª, is disabled to permit the releasing spring 80 to shift the carrier and its detents to ineffective position as the register tripping mechanism is operated. While it is true that the main drive shaft when starting on its initial stroke, at once commences to lower the wheels into engagement with their driving means, the arc through which the props 23 must swing to effect this engagement is so much greater than the distance through which the detents must move to release the wheels, that such release is effected before the wheels have dropped any appreciable distance. The depression of the total key 60 rocks the setting lever 61ª, the arm 62ª of which carries a dog 90 pivoted at 91, to engage a shoulder 92 on the restoring lever 88 and swing the latter to idle position, thereby removing all obstruction in the path of the carrier, and operating to silence the detent-restoring means. To enable the restoring lever 88 to be shifted out of the path of the detent carrier, notwithstanding the position of the tappet 15ª, said lever carries an adjusting plate 94 pivoted at 95 to the lever and held projected beyond the edge of the lever by a spring 96. A stop 97 arrests the plate in one direction. In the accumulating operation, the tappet impinges the adjusting plate to press the restoring lever 88 against the carrier 77 to return the detents 76, (Fig. 1). When, however, the total key 60 is operated, the adjusting plate 94 is pressed against the tappet and yields to permit the restoring lever 88 to rock out of the path of the carrier. Said lever may be recessed, as at 93, opposite the tappet, which recess is normally closed to the tappet by said adjusting plate, but which fits over the tappet when the lever is rocked to idle position.

At the outset of the initial stroke of the main drive shaft, the link 85 and its arm 84 are moved forwardly by the prop 23 and the spring 80 withdraws the detents from engagement with the registers and swings the carrier against the stop 87 without obstruction by the restoring lever. At the end of said initial stroke, the setting lever 61ª is returned toward normal position by its spring 73, thereby withdrawing the dog 90 from engagement with the restoring lever 88 to enable said lever to be operated by the tappet during the return stroke of the drive shaft 11 to restore the detents.

In taking a sub-total, the mechanism controlling such operation, as heretofore explained, is held depressed during both the initial and return strokes of the main shaft, it being restored only at the completion of said return stroke. Hence the dog 90 would ordinarily hold the restoring lever 88 disabled or silenced until the return stroke was completed, and prevent the restoration of the detents at the time of disengagement of the wheels and their driving means. It is desirable, however, that the detents be returned to effective position prior to the restoration of the register to idle position, just as in the accumulating operation. To effect this operation, the restoring lever must be released from the dog prior to the completion of the return stroke of the main shaft.

On the initial stroke of the main shaft 11, the detents are quickly disengaged from the wheels, so as not to be struck thereby when the latter drop into engagement with the racks, 4, as in the totaling or clearing operation. The arm 84, however, is provided with a releasing link 98 preferably riding on a guide 99 and having a cam slot 100 in which fits a roll or projection 101 carried by the dog 90.

Figure 4:
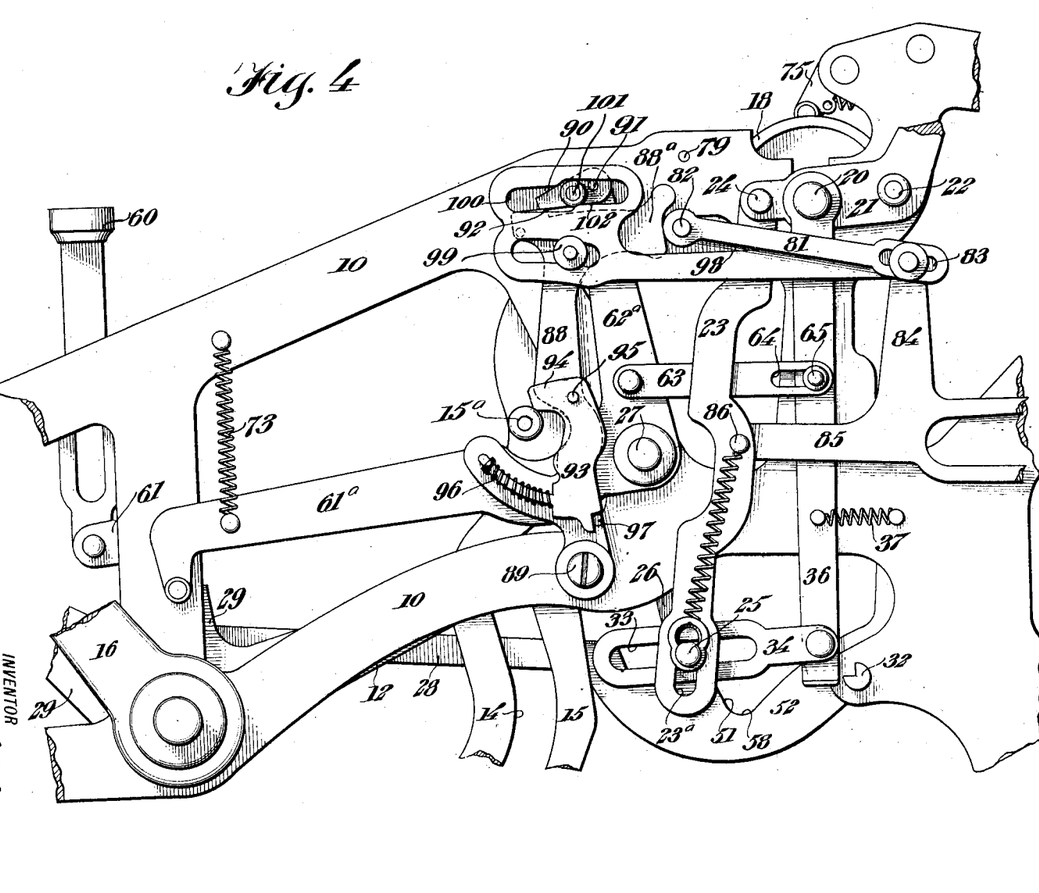
Fig. 4 shows the position of the parts, when the main shaft has partially completed its return stroke, the total key being depressed, as in taking a sub-total.

On the initial stroke of the main shaft, the releasing link 98 is drawn forwardly by the arm 84, the cam slot moving idly relatively to the dog until the detents have been shifted to ineffective position as in the totaling operation and the registers have engaged their drive means, whereupon the cam portion 102 of the slot contacts the projection 101 to free the restoring lever by releasing the dog therefrom, during the latter part of said initial stroke. The cam operates to hold the dog inactive during the first part of the return stroke of the main shaft, until after the tappet 15ª has impinged the lever 88 to rock the latter to restore the detents, such rocking also operating to move the shoulder 92 of the lever past the point where it may be engaged by the dog, (Fig. 4). The parts are then returned to normal position as usual.

It will be remembered that the carrying or transferring from one register wheel to the next, takes place subsequently to the accumulating or adding operation, and during the time when the register wheels are being restored to idle position after disengagement from their drive means. At such time, however, the detents are engaged with and normally lock the wheels. Hence it is desirable that provision be made to disable the detents irrespective of the lock 81 to permit the carrying operation. As one means to effect this, the detents are loosely mounted on the carrier, as by pins 103 passing through slots 104 in the detents, the lower ends 105 of said detents resting on the forward arms of the rocking or carrying-levers 38 along which they travel as the carrier is shifted and by which they are supported in position to lock the wheels. When a trigger 45 is tripped by its cam 48, as in Fig. 8, to release the carrying lever 38 of the adjacent wheel of higher order, the detent corresponding with the tripped lever is left unsupported and either falls by gravity or is pushed by the ratchet 41 to idle position (as the ratchet is turned by the carrying pawl 40) so that its tooth 78 is ineffective or silenced (see Figs. 8 and 9, the intermediate wheel in Fig. 6 and the intermediate detent in Fig. 7). The resetting of the rocking lever by the rod 54 and restoring link 56 raises or returns the detent tooth 78 to locking position.

It is evident that changes might be made in the form and arrangement of the several parts disclosed without departing from the spirit and scope of the invention.

I claim—

1. In a calculating machine, the combination with counters, driving means therefor, and mechanism to effect the engagement and disengagement of the counters and driving means, of detents for said counters, locking means to maintain the detents effective, means tending to shift the detents to idle position, and means independent of the locking means to restore said detents.

2. In a calculating machine, the combination with counters, driving means therefor, mechanism to effect the engagement and disengagement of the counters and their driving means, and a rocking drive shaft, of detents for said counters, means tending to shift said detents to idle position, restoring means to return said detents, and means independent of the restoring means to lock said detents in normal effective position on the return stroke of the drive shaft.

3. In a calculating machine, the combination with counters, and driving means therefor, of detents for said counters, means to shift said detents to idle position, a lock to hold said detents effective, means to release the lock, restoring means to return the detents to effective position, and means to silence said restoring means prior to the shifting of the detents to idle position.

4. In a calculating machine, the combination with registers, drive means therefor, means to effect the engagement and disengagement of the registers and drive means; and a main drive shaft, of an over-rotation preventer for the registers, shiftable into and out of operative position relatively thereto; a restoring member to shift the over-rotation preventer into operative position; and a lock to hold the over-rotation preventer effective.

5. In a calculating machine, the combination with several counters, and means to drive or turn said counters, of detents to lock the counters against rotation, means normally tending to shift the detents to inactive position, restoring mechanism to return the detents, and means effective to silence the detent-restoring means.

6. In a calculating machine, the combination with several counters, means to drive or turn said counters, and mechanism to effect the engagement and disengagement of the counters and their driving means, of detents to lock the counters against rotation, means normally tending to shift the detents to inactive position, restoring means to return the detents, a lock to insure the efficiency of the detents, and a key to silence the detent-restoring means.

7. In a calculating machine, the combination with counters, driving means therefor, and mechanism to effect the engagement and disengagement of the counters and driving means, of detents to prevent over-rotation of the counters, means to shift the detents to idle position, restoring means to return the detents, means to shift the restoring means to and hold it in idle position prior to the operation of the machine, and means to release the restoring means for operation.

8. In a calculating machine, the combination with counters, driving means therefor, restoring mechanism for the driving means, and shiftable detents to prevent over-rotation of the counters, of a lock independent of the driving means and its restoring mechanism, to normally maintain the detents effective.

9. In a calculating machine, the combination with several counters, means to drive or turn said counters, and mechanism to control the engagement and disengagement of the counters and their driving means, of a shiftable carrier, several detents connected therewith, to hold the counters against rotation, means to shift the carrier to move said detents into and out of effective position relatively to the counters, and a lock to maintain said detents effective.

10. In a calculating machine, the combination with several counters, means to drive or turn said counters, and mechanism to control the engagement and disengagement of the counters and their driving means, of a shiftable carrier, several detents connected therewith, to hold the counters against turning, a spring normally tending to shift the carrier to withdraw the detents from effective position relatively to the counters, a lock to hold the detents in effective position, and a restoring lever to return the detents and carrier prior to the effective operation of the lock.

11. In a calculating machine, the combination with several counters, means to drive or turn said counters, and mechanism to effect the engagement and disengagement of the wheels and their driving means, of a shiftable carrier; detents loosely mounted on said carrier for independent movement relatively thereto, and normally holding the counters against over-rotation; means to shift the carrier to move the detents into and out of effective position; a lock to maintain the detents effective; and vibratory transfer devices for the counters to effect a carry from one counter to another of a higher order, said detents resting upon their respective transfer devices to become ineffective when a carry is being effected on their respective wheels, notwithstanding the lock.

12. In a calculating machine, the combination with counters, drive means therefor, mechanism to effect the engagement and disengagement of the counters and their drive means, and carrying mechanism, of detents to arrest the counters against over-rotation, and shiftable to idle position, restoring mechanism to return the detents, and a lock independent of the carrying and restoring mechanisms to maintain said detents normally effective when at rest.

13. In a calculating machine, the combination with counters, driving means therefor, and carrying mechanism to effect a transfer from one to another of said counters, of a plate or carrier extending across the machine and pivotally supported at its ends, detents on said carrier to normally prevent over-rotation of the counters, a spring tending to swing the carrier and its detents to ineffective position, and a restoring lever contacting the carrier to return the detents against the spring tension.

14. In a calculating machine, the combination with counters, driving means therefor, restoring mechanism for the drive means, and carrying mechanism to transfer from one to another of said counters, of a shiftable carrier independent of the transfer mechanism, detents thereon to prevent over-rotation of the counters, means to shift the carrier to release the detents from the counters, and a restoring lever operated by the drive-restoring mechanism and contacting the carrier to return the detents.

15. In a calculating machine, the combination with counters, driving means therefor, restoring mechanism for the drive means, and carrying mechanism to transfer from one to another of said counters, of a shiftable carrier independent of the transfer mechanism, detents thereon to prevent over-rotation of the counters, means to shift the carrier to release the detents from the counters, a tappet on the drive-restoring mechanism, and a restoring lever in the path of said tappet to contact the carrier and return the detents.

16. In a calculating machine, the combination with counters, driving means therefor, restoring mechanism for the drive means, and carrying mechanism to transfer from one to another of said counters, of shiftable detents to arrest the counters, means tending to release the detents from the counters, a lock normally maintaining the detents effective, means to free the detents from the lock, and a restoring lever, operated by the drive-restoring mechanism to return the detents.

17. In a calculating machine, the combination with counters, driving racks therefor, mechanism controlling the engagement and disengagement of the counters, and racks; and rack-restoring mechanism, of shiftable detents to prevent over-rotation of the counters; means tending to release the detents from the counters, a lock controlled by the said mechanism through which is effected the engagement and disengagement of the racks and counters, to normally maintain the detents effective; and a restoring lever operated by the rack-restoring mechanism, to return the detents.

18. In a calculating machine, the combination with counters, driving racks therefor, means to drive the racks in one direction, mechanism controlling the engagement and disengagement of the counters and racks, rack-restoring mechanism; a key to influence the controlling mechanism through which the engagement and disengagement of the counters and racks is effected, when taking a total or sub-total, or when clearing the machine; and shiftable, over-rotation preventing detents for the counters, of a lock operable by said control mechanism to normally maintain the detents effective; and a restoring device operated by the rack-restoring mechanism, to return the detents, and shiftable out of the path of the detents by the operation of said key.

19. In a calculating machine, the combination with counters, driving means, mechanism to effect the engagement and disengagement of the counters and their driving means, detents to prevent over-rotation of the counters, and means tending to shift said detents to inactive position, of a restoring device to return said detents, a driver to operate said device, an adjusting plate on said device in the path of the driver, a key-controlled lever, and a dog on said last-named lever to shift the restoring device to idle position, said adjusting plate arranged to yield to enable the restoring device to clear the driver when shifted by the dog.

20. In a calculating machine, the combination with counters, driving means, mechanism to effect the engagement and disengagement of the counters and their driving means, detents to prevent over-rotation of the counters, and means tending to shift said detents to inactive position, of a restoring lever to return said detents, a driver to operate said lever, an adjusting plate on said lever in the path of the driver, a key-controlled lever, and a dog on said last-named lever to engage the restoring lever and shift it to idle position, said adjusting plate arranged to yield to enable the restoring lever to clear the driver when rocked by the dog, and means to release the dog to enable the restoring lever to resume its functions.

21. In a calculating machine, the combination with counters; driving means therefor, movable from and toward initial position, and normally disengaged from the counters; mechanism to effect the engagement and disengagement of the counters and driving means; a key-controlled means connected to said mechanism, to vary the time and duration of such engagement relatively to the initial and return strokes of the driving menas; detents to lock the counters against rotation; and means to shift the detents to idle position, operating in timed relation to the driving means; of a restoring lever to return said detents, and a dog operated by the key-controlled means to temporarily silence the restoring lever.

22. In a calculating machine, the combination with counters; driving means therefor, movable from and toward initial position, and normally disengaged from the counters; mechanism to effect the engagement and disengagement of the counters and driving means; a key-controlled means connected to said mechanism, to vary the time and duration of such engagement relatively to the initial and return strokes of the driving means; detents to lock the counters against rotation; and means to shift the detents to idle position, operating in timed relation to the driving means, of a restoring lever to return said detents; a dog to shift the restoring lever to and hold it in idle position; and a release to disengage the dog to enable the restoring lever to resume its functions.

23. In a calculating machine, the combination with counters; driving means therefor, normally disengaged therefrom; and mechanism to effect the engagement and disengagement of the counters and drive means; of detents to arrest the rotation of the individual counters, a shiftable carrier on which the detents are mounted, an arm connected to said mechanism to be moved back and forth therewith, and a link connecting the carrier with said arm to control the detents.

24. In a calculating machine, the combination with counters; drive means normally disengaged therefrom; mechanism to effect the engagement and disengagement of the counters and drive means; and detents to arrest the rotation of the counters, of a shiftable carrier on which the detents are mounted; means controlled by said mechanism, to shift the carrier in the accumulating operation to release the detents from the counters; and a restoring member operated in timed relation with the disengagement of the counters and driving means to return the detents.

25. In a calculating machine, the combination with a main shaft, counters, drive means normally disengaged therefrom; and mechanism to effect the engagement and disengagement of the counters and their drive means, said mechanism connected to operate substantially synchronously with the shaft; of detents to arrest the counters, means tending to shift the detents to idle position, and restraining means to lock the detents in effective position, said restraining means controlled by said mechanism to effect a speedy release of the detents.

26. In a calculating machine, the combination with counters, driving means normally disengaged therefrom, mechanism to effect the engagement and disengagement of the counters and driving means, detents to arrest the counters, and means to shift the detents to idle position, of a slotted link controlled by said mechanism and movable with the detents, to normally maintain the detents effective, and a restoring member operable by means other than said mechanism, to return the detents prior to the effective operation of the link.

27. In a calculating machine, the combination with counters, driving means normally disengaged therefrom, mechanism to effect the engagement and disengagement of the counters and driving means, detents to prevent over-rotation of the counters, and means tending to shift the detents to idle position, of a lock operated by said mechanism to maintain said detents effective, a restoring member to return said detents; a key-controlled lever having a dog to throw the restoring member to, and hold it in idle position; and means controlled by said mechanism to release the dog and free the restoring member.

28. In a calculating machine, the combination with counters, driving means normally disengaged therefrom, mechanism to effect the engagement and disengagement of the counters and driving means, detents to prevent over-rotation of the counters, and means tending to shift the detents to idle position, of a lock operated by said first named mechanism to maintain said detents effective, a restoring member to return said detents; a key-controlled lever having a dog to throw the restoring member to, and hold it in idle position; a projection on the dog, a releasing link operated by said first-named mechanism and having a slot therein entered by the projection, and a cam on the wall of the slot to contact the projection on the dog to release the restoring member.

29. In a calculating machine, the combination with a main shaft, counters, driving means normally disconnected therefrom, mechanism to effect the connection and disconnection of the counters and drive means; and a total and sub-total key to control the time of such connection and disconnection relatively to the rotation of the main shaft and carrying devices; of detents to prevent over-rotation of the counters, means tending to shift the detents to idle position; a lock controlled by said first-named mechanism, to hold the detents normally effective; a restoring means to return the detents; and mechanism controlled by the total and sub-total key to shift the restoring means to, and hold it in idle position prior to the release of the detents to permit the latter to free the counters before they are connected with the driving means.

30. In a calculating machine, the combination with a main shaft, counters, driving means normally disconnected therefrom, mechanism to effect the connection and disconnection of the counters and driving means; and a total and sub-total key to control the time of such connection and disconnection relatively to the rotation of the main shaft and carrying devices; of detents to prevent over-rotation of the counters, means tending to shift the detents to idle position, a lock controlled by said first-named mechanism, to hold the detents normally effective, a restoring means to return the detents; mechanism controlled by the total and sub-total key to shift the restoring means to and hold it in idle position prior to the release of the detents to permit the latter to free the counters before they are connected with the driving means; and means also controlled by said first-named mechanism to release the restoring means for operation prior to the disconnection of the counters and driving means when taking a total or sub-total.

31. In a calculating machine, the combination with counters, driving racks normally disengaged therefrom, mechanism to effect the engagement and disengagement of the racks and counters; a key controlling the time of such engagement and disengagement to take a sub-total or to clear the machine; and carrying mechanism, of detents to prevent over-rotation of the counters, means tending to shift the detents to idle position; a restoring member to return the detents, a tappet operated from the main shaft to actuate such restoring member, mechanism controlled by said key to disable the restoring member when a sub-total is to be taken, an adjusting plate on said restoring member normally contacted by said tappet and yielding to permit the restoring member to clear said tappet when disabled, and means to release the restoring member from said key-controlled mechanism prior to the disengagement of the racks and counters when taking a sub-total.

32. In a calculating machine, the combination with several individually rotatable counters, means to turn the same; and carrying mechanism including rockers, to transfer from one to another of said counters; of shiftable detents to prevent over-rotation of the counters, a carrier on which the detents are loosely mounted, and means to operate said carrier whereby the detents are simultaneously shifted from and toward the counters, said detents resting on the carrying rockers to independently release the respective counters with which they coöperate during the carrying operation.

33. In a calculating machine, the combination with counters 18, driving racks 4 normally disengaged therefrom, and mechanism comprising a trip rod 25, a prop 23, a supporting leg 30, and a link 34, to control the engagement and disengagement of the counters and racks, of a shiftable carrier 77, detents 76 loosely mounted thereon, to prevent over-rotation of the counters, a spring 80 tending to shift the carrier to render the detents ineffective; a lock comprising a link 85 connected with the said first-named mechanism and having an arm 84, and a locking bar 81 between the arm and the carrier; a restoring lever 88 contacting said carrier to return the detents to effective position, a tappet 15ª to operate the restoring lever, a key-controlled lever 61ª, 62ª having a dog 90 to engage and rock the restoring lever to idle position; an adjusting plate 94 normally contacted by said tappet and yielding when the restoring lever is rocked to idle position to enable the latter to clear the tappet; and a releasing cam 102 controlled by said first-named mechanism to free the restoring lever.

34. A calculating machine, having a vibratory main shaft, counters rotated by suitable driving means, the over-rotation of said counters being prevented by detents normally held in effective position by a suitable lock which, when the machine is operated, is disabled, to permit the detents to be shifted to ineffective position, said detents being returned after the adding operation is completed by a restoring lever which may be temporarily disabled by the operation of a total and sub-total key through a dog which rocks the restoring lever out of the way, to permit the detents to free the counters at the commencement of the initial stroke of the main shaft, said dog being released or tripped to enable the restoring lever to operate to return the detents as the counters are released from their driving means.

35. In a calculating machine, the combination with register members, drive members therefor, the drive and register members adapted for engagement and disengagement; and a main drive shaft; of an over-rotation preventer for said register members, a lock to hold said over-rotation preventer effective; means to shift the over-rotation preventer to idle position, upon the release of the lock prior to the engagement of the drive and register members; and a restoring lever to shift said over-rotation preventer to effective position, substantially at the time of disengagement of the drive and register members.

36. In a calculating machine, the combination with register members, drive members therefor, the drive and register members adapted for engagement and disengagement; a main drive shaft; and clearing mechanism to vary the time of engagement and disengagement of the drive and register members; of an over-rotation preventer shiftable into and out of effective position relatively to the register members; a restoring lever normally lying in the path of the over-rotation preventer to return the latter to effective position; and disabling mechanism controlled by the clearing mechanism, to displace the restoring lever prior to the operation of the main drive shaft.

37. In a calculating machine, the combination with register members, drive members therefor, the drive and register members adapted for engagement and disengagement; a main drive shaft; and clearing mechanism to vary the time of engagement and disengagement of the drive and register members; of an over-rotation preventer shiftable into and out of operative relation to the register members; a lock to hold said over-rotation preventer effective; means to release the lock prior to the engagement of the drive and register members; a restoring lever normally lying in the path of the over-rotation preventer to return the latter to effective position; and disabling mechanism operable by the clearing mechanism, to displace the restoring lever prior to the operation of the main drive shaft.

38. In a calculating machine, the combination with register members, drive members therefor, the drive and register members adapted for engagement and disengagement; and sub-totaling mechanism to vary the time of engagement and disengagement of the drive and register members; of an over-rotation preventer shiftable into and out of effective position relatively to the register members; a restoring lever to return the over-rotation preventer to effective position, and normally lying in the path of said over-rotation preventer; disabling means controlled by the sub-totaling mechanism, to displace the restoring lever and hold it inoperative; and means to trip the disabling means to permit the effective operation of the restoring lever.

39. In a calculating machine, the combination with register members, drive members therefor, the drive and register members adapted for engagement and disengagement; and sub-totaling mechanism to vary the time of engagement and disengagement of the drive and register members; of an over-rotation preventer shiftable into and out of effective position relatively to the register members; a lock to hold said over-rotation preventer effective; means to release the lock prior to the engagement of the drive and register members; a restoring lever normally lying in the path of the over-rotation preventer, and adapted to return the latter to effective position; disabling means operated by the sub-totaling mechanism to displace the restoring lever prior to the engagement of the drive and register members, and to hold it displaced; and means to trip the disabling means prior to the disengagement of the drive and register members.

40. An over-rotation preventer for the counters of a calculating machine, adapted to quickly release the counters prior to their connection with their driving means, and to speedily engage said counters upon the disconnection of the latter from their driving means, to which ends, said over-rotation preventer is automatically shifted to ineffective position, as soon as a lock, which normally holds it effective, is released, said over-rotation preventer being returned to effective position by a restoring member operable prior to the lock, and normally lying in the path of the over-rotation preventer, said restoring member adapted to be displaced when the calculating mechanism is set for certain operations, such displacing mechanism being releasable to permit the functioning of the restoring member in certain other operations of the machine.

FRANK H. BICKFORD.

In the presence of—
DANIEL C. SPENCER,
HARRY NELSON.

Copies of this patent may be obtained for five cents each, by addressing the "Commissioner of Patents, Washington, D. C."